US012627530B2

(12) United States Patent
Koteshwar Srinath

(10) Patent No.: US 12,627,530 B2
(45) Date of Patent: May 12, 2026

(54) DATA SIGNAL PROCESSING IN MULTIPLE SUB-PANEL-BASED UPLINK MIMO TRANSMISSION

(71) Applicant: Nokia Solutions and Networks Oy, Espoo (FI)

(72) Inventor: Pavan Koteshwar Srinath, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/790,883

(22) Filed: Jul. 31, 2024

(65) Prior Publication Data

US 2025/0047526 A1 Feb. 6, 2025

(30) Foreign Application Priority Data

Aug. 4, 2023 (EP) ..................................... 23189644

(51) Int. Cl.
| | |
|---|---|
| *H04L 25/02* | (2006.01) |
| *H04B 7/0417* | (2017.01) |
| *H04B 17/391* | (2015.01) |

(52) U.S. Cl.
CPC ....... *H04L 25/021* (2013.01); *H04B 17/3913* (2015.01); *H04L 25/0254* (2013.01); *H04B 7/0417* (2013.01)

(58) Field of Classification Search
CPC . H04B 17/3913; H04B 7/0417; H04L 25/021; H04L 25/0254
See application file for complete search history.

(56) References Cited

U.S. PATENT DOCUMENTS

| | | | |
|---|---|---|---|
| 2013/0016767 A1* | 1/2013 | Pean | H04L 1/20 |
| | | | 375/232 |
| 2015/0295670 A1* | 10/2015 | Seyama | H04B 7/068 |
| | | | 370/329 |

(Continued)

FOREIGN PATENT DOCUMENTS

WO 2022/074639 A2 4/2022

OTHER PUBLICATIONS

Dobre et al., "Data-Driven Soft Demapping for Residual Impairments Channels", IEEE Communications Letters, vol. 26, No. 11, Nov. 2022, pp. 2611-2615.

(Continued)

*Primary Examiner* — Janice N Tieu
(74) *Attorney, Agent, or Firm* — Nokia Technologies Oy

(57) ABSTRACT

According to an example embodiment, a method comprising obtaining received data signals representative of one or more bits of information transmitted by at least one user equipment to a receiver of a radio cellular network, said receiver comprising two or more sub-panels of antennas, obtaining interference and noise covariance matrices individually estimated at at least two of said sub-panels for said received data signals, obtaining equalized signals by performing joint channel and noise equalization of said received data signals at least from said estimated covariance matrices, for at least one bit of said information transmitted by one of said users, obtaining a first set of LLRs, generated at least from said received data signals and said equalized signals, and obtaining a second set of applying the LLRs and the covariance matrices as inputs to a neural network, said neural network having been trained to output corrected LLRs.

10 Claims, 9 Drawing Sheets

(56)　　　　　　References Cited

U.S. PATENT DOCUMENTS

| | | | |
|---|---|---|---|
| 2016/0373204 A1* | 12/2016 | Yamada | H04J 11/0026 |
| 2023/0067545 A1* | 3/2023 | Hattab | H04L 5/0048 |

OTHER PUBLICATIONS

"3rd Generation Partnership Project; Technical Specification Group Radio Access Network; Study on channel model for frequencies from 0.5 to 100 GHz (Release 17)", 3GPP TR 38.901, V17.0.0, Mar. 2022, pp. 1-98.
Extended European Search Report received for corresponding European Patent Application No. 23189644.0, dated Feb. 1, 2024, 8 pages.

* cited by examiner

64-TRX (4x8x2) @ 3.5 GHz            256-TRX (8x16x2) @ 7.0 GHz

All signals are processed jointly         Signals at each sub-panel are processed independently

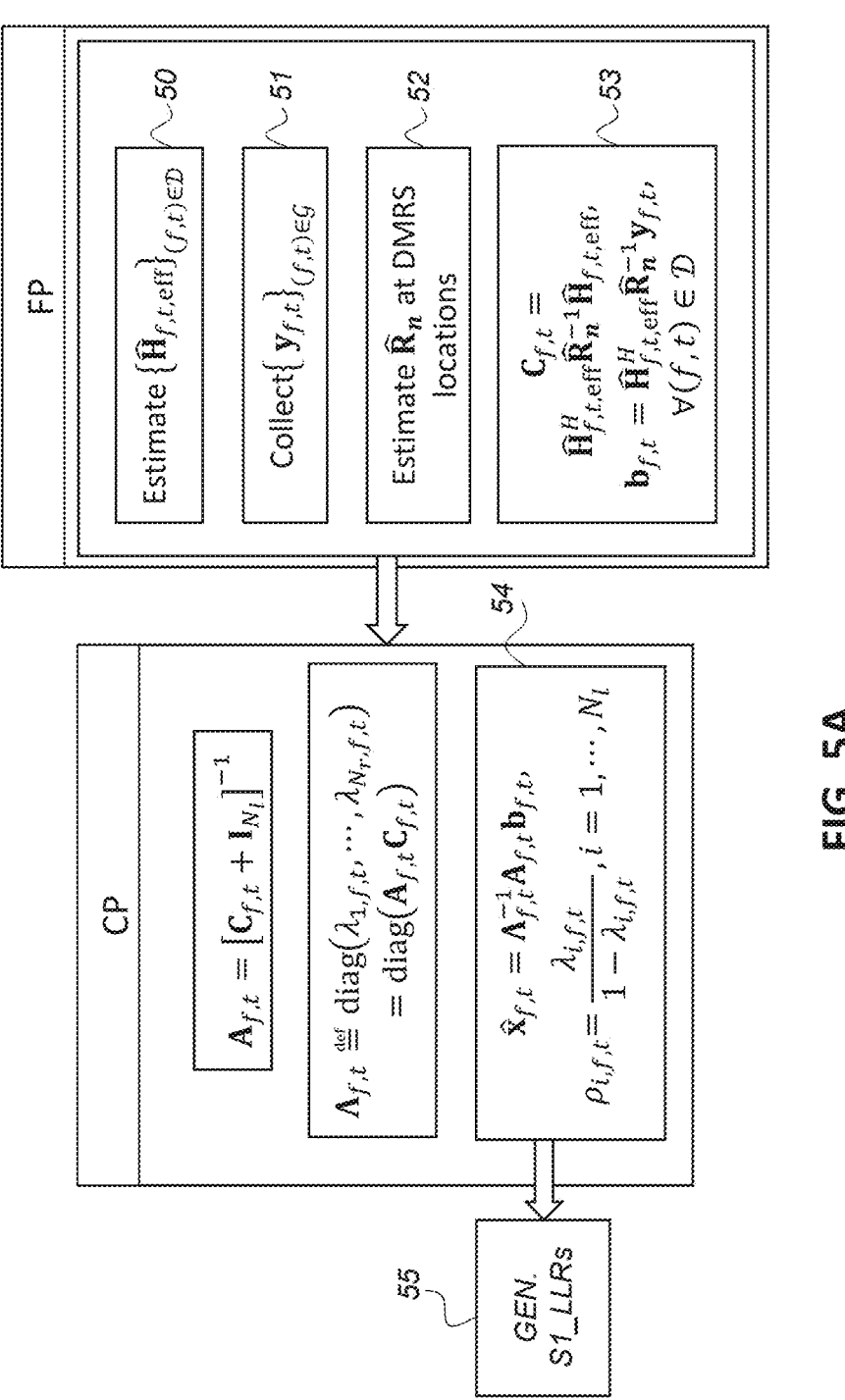

FP

Estimate $\{\widehat{\mathbf{H}}_{f,t,\text{eff}}\}_{(f,t)\in\mathcal{D}}$ ⟿ 50

Collect $\{\mathbf{y}_{f,t}\}_{(f,t)\in\mathcal{G}}$ ⟿ 51

Estimate $\widehat{\mathbf{R}}_n$ at DMRS locations ⟿ 52

$\mathbf{C}_{f,t} = \widehat{\mathbf{H}}_{f,t,\text{eff}}^H \widehat{\mathbf{R}}_n^{-1} \widehat{\mathbf{H}}_{f,t,\text{eff}},$
$\mathbf{b}_{f,t} = \widehat{\mathbf{H}}_{f,t,\text{eff}}^H \widehat{\mathbf{R}}_n^{-1} \mathbf{y}_{f,t},$
$(t',f) \in \mathcal{D}$ ⟿ 53

CP

$\mathbf{A}_{f,t} = [\mathbf{C}_{f,t} + \mathbf{I}_{N_l}]^{-1}$ $\mathbf{\Lambda}_{f,t} \stackrel{\text{def}}{=} \text{diag}(\lambda_{1,f,t}, \cdots, \lambda_{N_r,f,t})$
$= \text{diag}(\mathbf{A}_{f,t}\mathbf{C}_{f,t})$ $\hat{\mathbf{x}}_{f,t} = \mathbf{\Lambda}_{f,t}^{-1}\mathbf{A}_{f,t}\mathbf{b}_{f,t},$
$\rho_{i,f,t} = \dfrac{\lambda_{i,f,t}}{1-\lambda_{i,f,t}}, i = 1, \cdots, N_l$

54

GEN.
S1_LLRs ⟿ 55

FIG. 5A

1 - Full-panel processing     2 - Sub-panel processing     3 - Sub-panels with DNN correction

DATA SIGNAL PROCESSING IN MULTIPLE SUB-PANEL-BASED UPLINK MIMO TRANSMISSION

RELATED APPLICATION

This application claims benefit of priority from European Patent App. No. 23189644.0, filed Aug. 4, 2023, the disclosure of which is hereby incorporated in its entirety by reference herein.

TECHNICAL FIELD

Various example embodiments relate generally to a method and receiver for processing data signals received from multiple user equipment in multiple sub-panel-based uplink Multi User-Multi Input Multi Output (MU-MIMO) Transmission.

BACKGROUND 6G standard is expected to enable a few times more data-rates than 5G. As a result, a base station (BS) or gNB is expected to be equipped with a higher number of antenna elements (AE) that are in the range 512-1024 (against a target of around for 5G). This will also necessitate a larger number of transceivers (TRX), around 256-512 compared to 32-64 in 5G, and the frequency band of interest is expected to be 7-20 GHz. This is called an "extreme MIMO system". As illustrated by FIG. 1, a larger number of TRXs can be accommodated within the same-sized antenna array by shifting to a larger carrier frequency.

When progressing from 64 TRX to 256 or more TRX at a gNB, the following challenge immediately presents itself. At present, there is a limit on the number of TRX that can fit in a single monolithic System-On-Chip (SoC) without dangerously overheating the chip. This number is closer to 64 for safe operations using latest CMOS (Complementary metal-oxide-semiconductor) processors (5 or 7 nm).

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a method comprises:
obtaining received data signals representative of one or more bits of information transmitted by at least one user equipment to a receiver of a radio cellular network, said receiver comprising two or more sub-panels of antennas,
obtaining interference and noise, I+N, covariance matrices individually estimated at at least two of said sub-panels for said received data signals,
obtaining equalized signals by performing joint channel and noise equalization of said received data signals at least from said estimated I+N covariance matrices,
for at least one bit of said one or more bits of information transmitted by one of said users, obtaining a first set of Log Likelihood Ratios, LLRs, generated at least from said received data signals and said equalized signals, and obtaining a second set by applying the first set of LLRs and the I+N covariance matrices as inputs to a neural network, said neural network having been trained to output corrected LLRs.

The method according to the first aspect may comprise combining said individually estimated I+N covariance matrices into an overall block-diagonal I+N covariance matrix, said overall I+N covariance matrix being used for obtaining the first set of LLRs.

In one or more non limiting exemplary embodiments, said neural network comprising a first and a second neural networks, the overall I+N covariance matrix is input to one or more convolutional layers of said first neural network, said first neural network being trained to output a vector of covariance elements, said method further comprises: concatenating said vector of covariance elements with a vector comprising said first set of LLRs, a concatenated vector being obtained, and applying said concatenated vector as an input to the second neural network, said corrected LLRs being output by said second neural network.

In one or more non limiting exemplary embodiments, the first and second neural networks are trained using a binary cross-entropy loss function.

According to a second aspect, an apparatus comprises means for performing a method comprising:
obtaining received data signals representative of one or more bits of information transmitted by at least one user equipment to a receiver of a radio cellular network, said receiver comprising two or more sub-panels of antennas,
obtaining interference and noise, I+N, covariance matrices individually estimated at at least two of said sub-panels for said received data signals,
obtaining equalized signals by performing joint channel and noise equalization of said received data signals at least from said estimated I+N covariance matrices,
for at least one bit of said one or more bits of information transmitted by one of said users, obtaining a first set of Log Likelihood Ratios, LLRs, generated at least from said received data signals and said equalized signals, and
obtaining a second set by applying the first set of LLRs and the I+N covariance matrices as inputs to a neural network, said neural network having been trained to output corrected LLRs.

The apparatus may comprise means for performing one or more or all steps of the method according to the first aspect. The means may include circuitry configured to perform one or more or all steps of a method according to the first aspect. The means may include at least one processor and at least one memory storing instructions that, when executed by the at least one processor, cause the apparatus to perform one or more or all steps of a method according to the first aspect.

According to third aspect, an apparatus comprises at least one processor and at least one memory storing instructions that, when executed by the at least one processor, cause the apparatus to perform:
obtaining received data signals representative of one or more bits of information transmitted by at least one user equipment to a receiver of a radio cellular network, said receiver comprising two or more sub-panels of antennas,
obtaining interference and noise, I+N, covariance matrices individually estimated at at least two of said sub-panels for said received data signals, obtaining equalized signals by performing joint channel and noise equalization of said received data signals at least from said estimated I+N covariance matrices, for at least one bit of said one or more bits of information transmitted by one of said users, obtaining a first set of Log Likelihood Ratios, LLRs, generated at least from said received data signals and said equalized signals, and obtaining a second set by applying the first set of LLRs and the I+N covariance matrices as inputs to a neural network, said neural network having been trained to output corrected LLRs.

The instructions, when executed by the at least one processor, may cause the apparatus to perform one or more or all steps of a method according to the first aspect.

According to a fourth aspect, a receiver comprises two or more sub-panels of antennas and an apparatus according to the second aspect or the third aspect.

According to fifth aspect, a computer program comprises instructions that, when executed by an apparatus, cause the apparatus to perform:

obtaining received data signals representative of one or more bits of information transmitted by at least one user equipment to a receiver of a radio cellular network, said receiver comprising two or more sub-panels of antennas, obtaining interference and noise, I+N, covariance matrices individually estimated at at least two of said sub-panels for said received data signals, obtaining equalized signals by performing joint channel and noise equalization of said received data signals at least from said estimated I+N covariance matrices, for at least one bit of said one or more bits of information transmitted by one of said users, obtaining a first set of Log Likelihood Ratios, LLRs, generated at least from said received data signals and said equalized signals, and obtaining a second set by applying the first set of LLRs and the I+N covariance matrices as inputs to a neural network, said neural network having been trained to output corrected LLRs.

The instructions may cause the apparatus to perform one or more or all steps of a method according to the first aspect.

According to sixth aspect, a non-transitory computer readable medium comprises program instructions stored thereon for causing an apparatus to perform at least the following:

obtaining received data signals representative of one or more bits of information transmitted by at least one user equipment to a receiver of a radio cellular network, said receiver comprising two or more sub-panels of antennas, obtaining interference and noise, I+N, covariance matrices individually estimated at at least two of said sub-panels for said received data signals, obtaining equalized signals by performing joint channel and noise equalization of said received data signals at least from said estimated I+N covariance matrices, for at least one bit of said one or more bits of information transmitted by one of said users, obtaining a first set of Log Likelihood Ratios, LLRs, generated at least from said received data signals and said equalized signals, and obtaining a second set by applying the first set of LLRs and the I+N covariance matrices as inputs to a neural network, said neural network having been trained to output corrected LLRs.

The program instructions may cause the apparatus to perform one or more or all steps of a method according to the first aspect.

BRIEF DESCRIPTION OF THE DRAWINGS

Example embodiments will become more fully understood from the detailed description given herein below and the accompanying drawings, which are given by way of illustration only and thus are not limiting of this disclosure.

FIGS. 5A and 5B are block diagrams illustrating exemplary functional structures of a receiver configured to implement the method according to an example.

Figure 1:
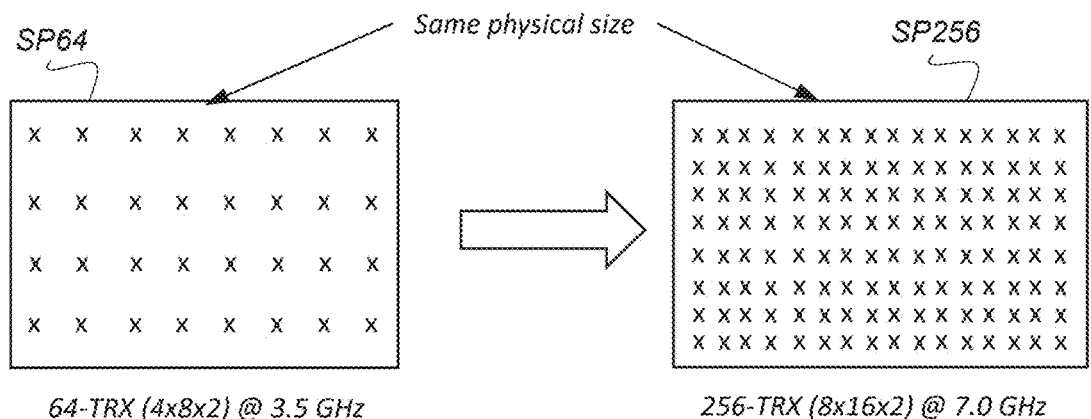
FIG. 1 (already described) is a schematic diagram illustrating accommodation of a larger number of TRX within a same panel forming a single antenna array for according to an example.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However, these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

In the following, different exemplary embodiments will be described using, as an example of an access architecture to which the exemplary embodiments may be applied, a radio access architecture based on long term evolution advanced (LTE Advanced, LTE-A) or new radio (NR, 5G, 6G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The method may be implemented for radio telecommunication systems, including a fifth generation (5G) network or sixth generation (6G) network. Prior or subsequent generations of radio telecommunication systems may be concerned by the method and apparatus as disclosed herein.

5G and 6G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHZ, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G or 6G networks may be network slicing in which multiple independent and dedicated virtual sub-networks (network instances) may be created within the same infrastructure to run services that have different requirements on latency, reliability, throughput and mobility.

In 5G or 6G networks, functionalities of the base station are split into distinct functional units, called ORAN (Open Radio Access Network), that are Radio Unit (RU), Distributed Unit (DU) and Core Unit (CU). RU is the radio unit that handles the digital front end (DFE) and the parts of the PHY layer, as well as the digital beamforming functionality.

DU is the distributed unit that sits close to the RU and runs the RLC, MAC, and parts of the PHY layer. This is a logical node that includes a subset of the eNB/gNB functions, depending on the functional split option, and its operation is controlled by the CU. RU is connected to DU via a e-CPRI ("evolved-Common Public Radio Interface") link.

CU is the centralized unit that runs the RRC and PDCP layers. The gNB consists of a CU and one DU connected to the CU via Fs-C and Fs-U interfaces for CP and UP respectively. A CU with multiple DUs will support multiple gNBs. The split architecture enables a 5G network to utilize different distribution of protocol stacks between CU and DUs depending on midhaul availability and network design. It is a logical node that includes the gNB functions like transfer of user data, mobility control, RAN sharing (MO-RAN), positioning, session management etc., with the exception of functions that are allocated exclusively to the DU. The CU controls the operation of several DUs over the midhaul interface.

An access node may be any type of base station (eNB, gNB, gNB-DU, gNB-CU, etc). At least part of the functionalities of the access node may also be carried out by a network entity (like a network node, a server, a host device, a host system) which is operably coupled to a transceiver (such as a remote radio head for example) and which may include other functions (such as an OAM function or another network function that may be used for implementing features in a NWDAF, Network Data Analytics Function, etc).

A base station may be a computing device configured to control the radio resources of communication system it is coupled to. The base station may also be referred to as an access point or any other type of interfacing device including a relay station capable of operating in a wireless environment. The base station may include or be coupled to transceivers. From the transceivers of the base station, a connection may be provided to an antenna unit that establishes bi-directional radio links to user devices. The antenna unit may comprise a plurality of antennas or antenna elements. The base station may further be connected to core network, CN. Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

A user equipment, UE, (or user terminal, user device) may refer to a computing device that includes wireless mobile communication devices operating with or without a subscriber identification module (SIM), including, but not limited to, the following types of devices: a mobile station (MS), a mobile phone, a radio cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples.

Figure 2:
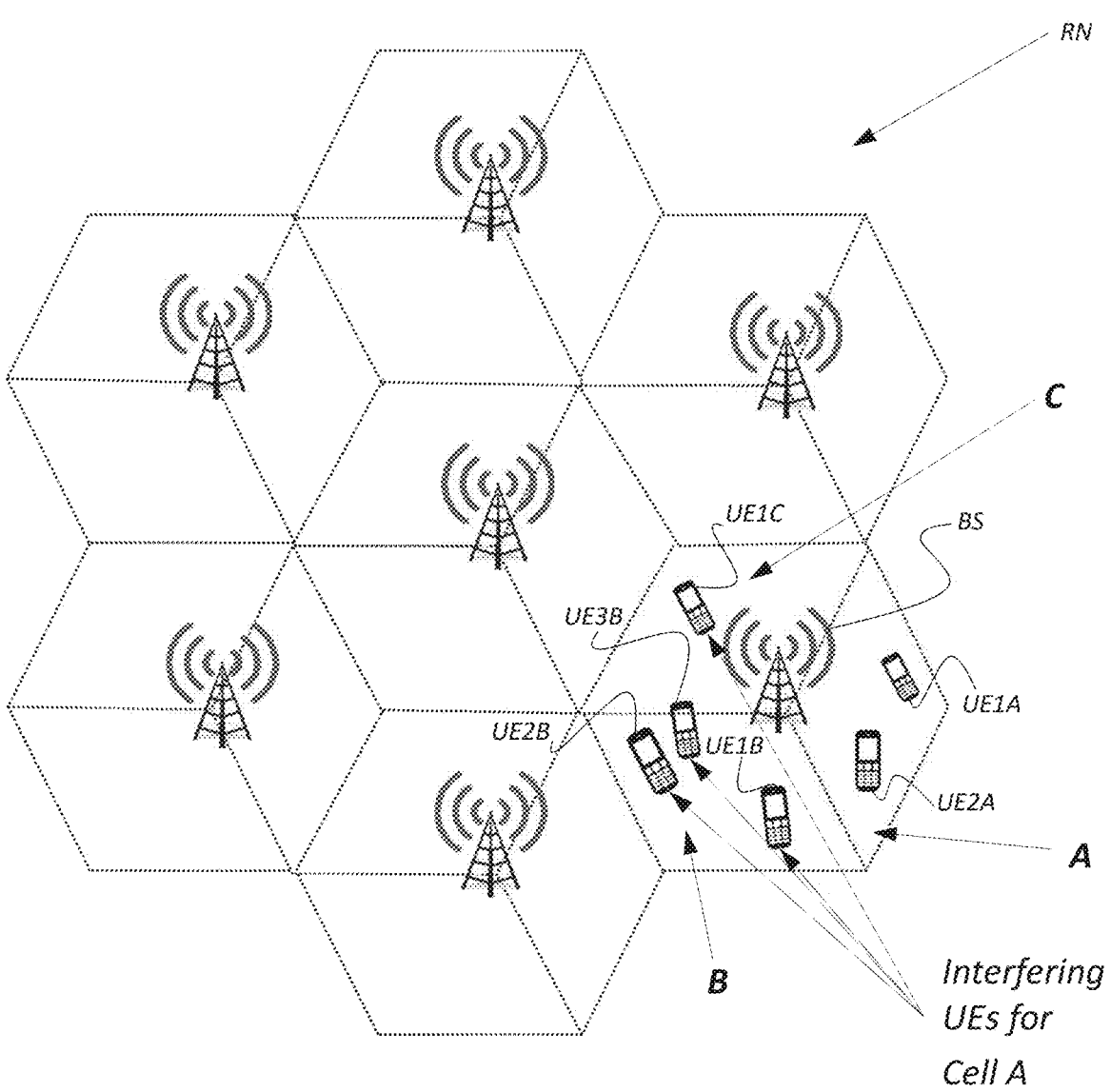
FIG. 2 illustrates a cellular radio network comprising a plurality of base stations serving several cells and equipped for MU-MIMO uplink transmission according to an example.

In relation with FIG. 2, a 5G or 6G radio cellular network RN comprises a plurality of base stations using MU-MIMO antennas. Among these base stations, a 3-sector base station BS is serving 3 cells A, B, C: Cell A comprising 2 co-scheduled user equipment (UE) UE1A, UE2A, cell B comprising 3 co-scheduled UEs UE1B, UE2B, UE3B, which are interfering UEs for cell A and cell C comprising one UE UE1C which is another interfering UE for cell A.

Figure 3:
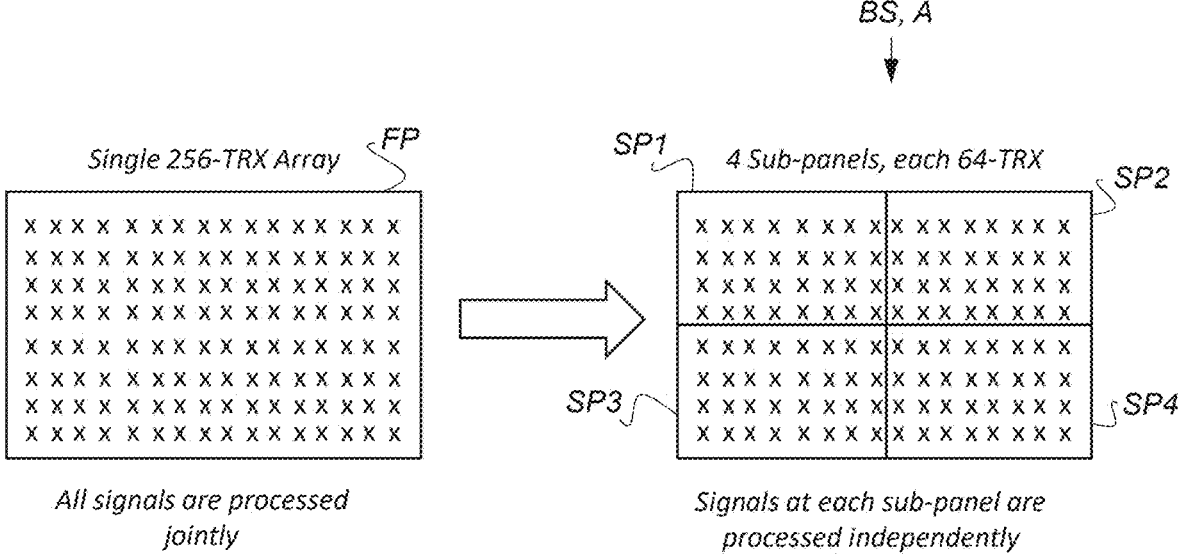
FIG. 3. is a schematic diagram illustrating use of multiple sub-panels forming distinct antenna arrays according to an example.

In relation with FIG. 3, at least the sector of base station BS serving cell A is equipped with a plurality of co-located sub-panels SP1-SP4, each being formed on a separate CMOS, in place of a single conventional full-panel FP. A plurality of TRX is accommodated within each sub-panel, in such a way that a same or a larger total number of TRX than within a single conventional panel are available. In particular, such a use of multiple SoCs allows to accommodate 256 or more TRXs. In the example of FIG. 3, a single TRX array of 8×16 TRX is replaced with 4 sub-panels SP1, SP2, SP3, SP4 of 4×8 TRX each. However, this is not a limiting example, as 64 or more TRX could be accommodated within each sub-panel, which would allow to get more than 256 TRX serving a same cell.

When multiple SoCs (hence sub-panels) are used, the received signals at each sub-panel need to be processed independently in order to minimize the computational complexity and the information exchange across sub-panels, which is expensive in terms of latency. This action would result in a loss of user equipment (UE) throughput compared to what is achievable when the signals are processed jointly (full-panel).

Indeed, as the sub-panels in context are co-located, there is a significant degree of antenna correlation between the antennas of different sub-panels. Interference-plus-noise (I+N) is an undesired signal at the receiver that is due to interference from users in the neighbouring cells (the 'I') and due to thermal noise (the 'N'). In scenarios where I>>N, I+N can be strongly coloured. This means that when the signals are independently processed within distinct sub-panels, the resulting equalized signal after suitable combining could be more inaccurate compared to that obtained by jointly processing the signals in the full-antenna space of a full-panel. In particular, the issue with sub-panel-based processing is that it induces a loss of fully I+N covariance information that is inherent to sub-panel-based processing. Without an architectural change, which would be expensive to implement, some of the incurred loss is irrecoverable. This would lead to a loss in UE throughput.

In the following, one or more example embodiments describe methods and apparatuses for processing data signals received by a receiver comprising a plurality of co-located sub-panels, which are aimed at alleviating this issue.

Figure 4:
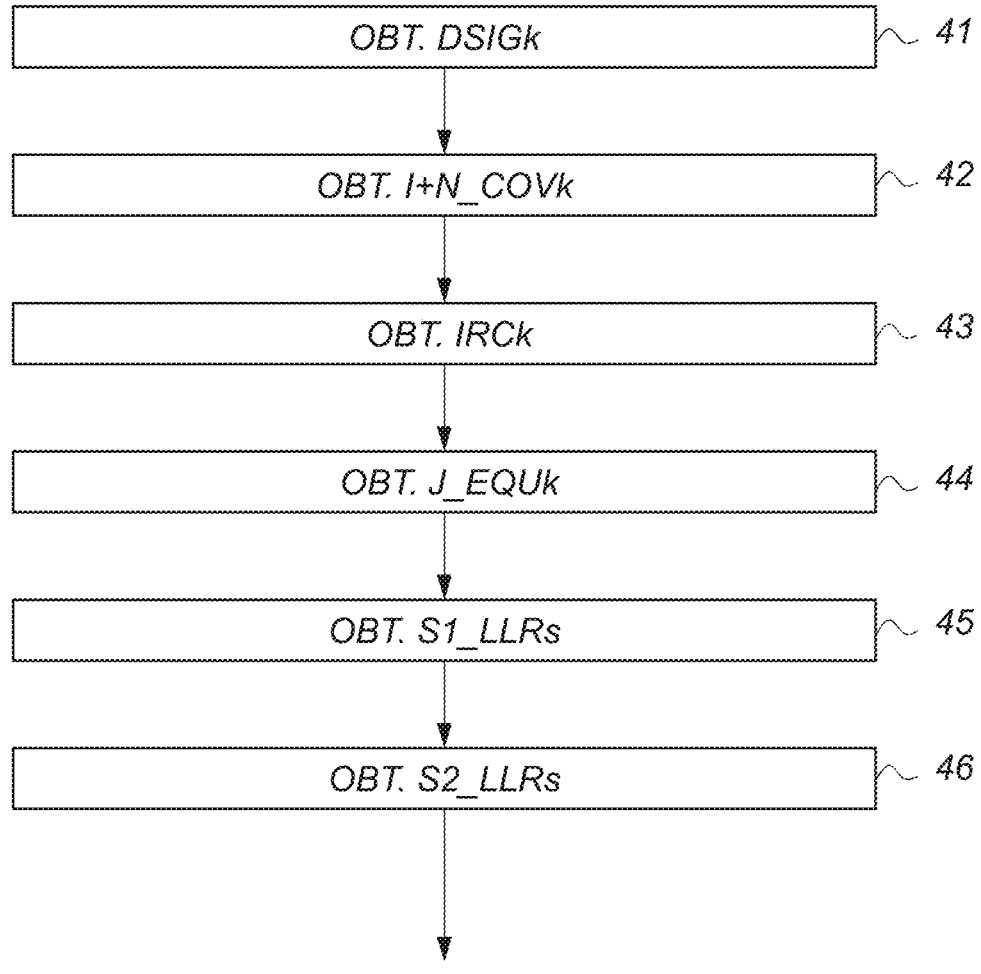
FIG. 4 is a flowchart of a method for processing data signals received by a plurality of sub-panels according to an example.

FIG. 4 shows a block diagram of a method of processing data signal according to one or more examples. For instance, said method is performed in an apparatus 100 which will be described hereinafter in relation with FIG. 7 or in an apparatus 900 which will be described hereinafter in relation with FIG. 9.

In one or more examples, said apparatus is integrated into a MU-MIMO receiver of a base station or a GNB of a 5G or 6G network, for example the base station BS of FIG. 2. Said receiver comprises a plurality K, with K an integer greater than or equal to 2, of sub-panels of antennas, which are arranged to serve a cell (cell A). As will be described hereinafter, in the context of a 5G or 6G network, said receiver may comprise at least one RU and one DU.

In a step 41, K data signals {DSIGk} are obtained, with k an integer comprised within 1 and K, by the K receiving sub-panels. They are each representative of one or more bits of information transmitted to said receiver by at least one, but usually several user equipment UE1A, UE2A attached to cell A.

In a step 42, interference and noise, K I+N, covariance matrices {I+N-COVk} are obtained. They are individually estimated for each of the K sub-panels for said received data signals, for instance at the RU.

In a step 44, joint Interference and noise equalization of the received signals is performed using at least said I+N covariance matrices. Equalized signals are obtained.

In a step 45, one first set of Log Likelihood Ratios (LLRs), S1_LLRs, is obtained. It is generated at least from said K received data signals {DSIGk} and said K I+N covariance matrices {I+N-COVk}. For example, they are generated at the DU. As known by the skilled person, LLRs are real numbers that indicate a belief of what (the values of the bits of information) the UE encoder transmitted to the receiver and that are used by the receiver to decode the received data signals.

In a step 46, one second set S2_LLRs is obtained, by applying the first set of LLRs S1_LLRs and the I+N covariance matrices {I+N-COVk} as inputs to a neural network, said neural network having been trained to output corrected LLRs forming the second set of LLRs S2_LLRs.

This method thus provides a correction of the first set of LLRs, already generated LLRs by sub-panel-based processing, that compensates for the loss of fully I+N covariances information inherent to sub-panel-based processing. This method is adapted to be performed in a 6G or next generation "extreme MIMO" system comprising a larger number of TRX than 5G conventional receivers that are accommodated within a plurality of co-located sub-panels. Therefore, the method provides a solution for processing received data signals that enables a few times more data rates than 5G MIMO systems.

In an exemplary non limiting embodiment, the method further comprises a step 43 of obtaining an overall I+N covariance matrix I+N_COV from the K I+N covariance matrices {I+N-COVk}. In an example, said overall I+N overall covariance matrix is approximated to have a block-diagonal structure given by the K I+N covariance matrices {I+N-COVk} put as block diagonal elements. According to the method, the obtained overall I+N covariance matrix I+N_COV may be exploited by step 44 for obtaining the equalized signals, as will be detailed further. An advantage is to get a single overall covariance matrix needed for further combined processing of the signals independently received by the two or more sub-panels, in a simple way.

In an exemplary non limiting embodiment, the neural network comprises a first and a second neural networks. The overall I+N covariance matrix is input to one or more convolutional layers of the first neural network, which has been trained to output a vector of covariance elements. The method further comprises concatenating said vector of covariance elements with a vector comprising said first set of LLRs. A concatenated vector is obtained and applied an input to the second neural network that outputs the second set of LLRs S2_LLRs.

A first advantage of using this first neural network is to convert the input overall I+N covariance matrix into a vector of covariance elements that can be combined with a vector comprising the first set of LLRs S1_LLRs. A second advantage is that it has convolutional layers that contribute to reduce a feature space of trainable parameters of the second neural network. At least one purpose of the first neural network is to find the lower-dimensional salient features of this large-dimensional input overall I+N covariance matrix while preserving the essential relationship between them. The first neural network is trained towards this goal. Doing so helps to ease the learning phase by reducing time and also memory.

In one or more non limiting exemplary embodiments, the first and second neural networks are trained using a binary cross-entropy loss function. An advantage is this loss function is very efficient.

In relation with FIG. 5A, conventional processing of data signals {DSIGk} received by a MU-MIMO receiver comprising a single full-panel FP is now detailed. In MU-MIMO, these received signals are representative of the bits of information transmitted to the receiver by all the co-scheduled UEs served by the cell. They are received in a step 51. As known in the art, these bits of information are encoded using channel coding, then mapped to suitable constellation points and transmitted using an OFDM technique. In the example of FIG. 2, these are UE1A and UE2A of cell A.

We first consider a MU-MIMO receiver with $N_r$ TRXs accommodated within a full-panel at the base station or gNB for the sector serving cell A and $N_u$ co-scheduled users, with $N_r$ an integer greater than or equal to 2, for example equal to 256, and $N_u$ an integer greater than or equal to 1. For example, the number of co-scheduled users $N_u$ may range from 1 to 15, with a median value within a range of 6-10.

Such a MU-MIMO receiver is a larger functionality which includes data signal reception, channel estimation, I+N covariance estimation, joint equalization, and LLR generation as will be described herein.

IN OFDM, a resource grid consists of multiple subcarriers and OFDM symbols in time domain. A resource element (RE) is the smallest unit of the resource grid made up of one subcarrier in frequency domain and one OFDM symbol in time domain. In the following, assumption is made of the following signal model: on any resource element RE indexed by the pair (f, t) where f denotes the subcarrier index and t denotes the time index, $$y_{f,t} = H_{f,t} s_{f,t} + n_{I+N}. \tag{1}$$

Here, $y_{f,t} \in \mathbb{C}^{N_r \times 1}$ is the received signal vector, $H_{f,t} \stackrel{\text{def}}{=} [H_{1,f,t}, H_{2,f,t}, \ldots, H_{N_u,f,t}]$ is the composite channel matrix with $H_{i,f,t} \in \mathbb{C}^{N_r \times N_t^{(i)}}$ denoting the channel matrix (to gNB/BS) from UE i equipped with $N_t^{(i)}$ transmit antennas, $s_{f,t} \stackrel{\text{def}}{=}$ $$[s_{1,f,t}^T, s_{2,f,t}^T, \ldots, s_{N_u,f,t}^T]^T$$

with $s_{i,f,t} \in \mathbb{C}^{N_t^{(i)} \times 1}$ being the $i^{th}$ user's transmit vector after possible precoding. The composite channel matrix is estimated at step 50.

$n_{I+N} \in \mathbb{C}^{N_r \times 1}$ is the interference+AWGN (I+N), where AWGN stands for "Additive white Gaussian noise" which is a basic noise model used in information theory to mimic the effect of many random processes that occur in nature.

$R_n$ is the covariance matrix of the interference-plus-noise, in the following designated by I+N covariance matrix, e.g. a matrix that describes the uncertainty surrounding the received data signals due to the effect of inter-cell user interference and thermal noise. The I+N covariance matrix is estimated at a step 52.

Further, let $$w_i \in \mathbb{C}^{N_t^{(i)} \times N_l^{(i)}}$$

be the precoding matrix (frequency flat) for UE i that transmits $$N_l^{(i)} \leq N_t^{(i)}$$

streams (or layers) of data $$x_{i,f,t} \stackrel{\text{def}}{=} [x_{1,i,f,t}^T, x_{2,i,f,t}^T, \ldots, x_{N_l^{(i)},i,f,t}^T]^T \in \mathbb{Q}_i^{N_l^{(i)} \times 1}$$

with each entry taking values from a unit energy $\mathbb{Q}_i$-QAM constellation of size $2^{m_i}$ for some $$m_i = 2, 4, 6, 8, \ldots . \text{ Let } N_l = \sum_{i=1}^{N_u} N_l^{(i)},$$

the total number of layers from all the users. With $H_{f,t,eff} \stackrel{\text{def}}{=} [H_{1,f,t} w1, H_{2,f,t} w2, \ldots, H_{N_u,f,t} w_{N_u}] \in \mathbb{C}^{N_r \times N_l}$, we have:

$$y_{f,t} = H_{f,t,eff} x + n_{I+N} \Rightarrow R_n^{-1/2} y_{f,t} = R_n^{-1/2} H_{f,t,eff} x + n_{f,t} \tag{2}$$

where $n_{f,t}$ is the whitened noise with covariance equal to the identity matrix. It should be noted that $H_{f,t,eff}$ stands for the effective channel seen by the base station or gNB due to the use of precoders (denoted by $w_i$) by the UEs.

In the following, it is assumed that LMMSE-IRC MU-MIMO detection is performed by the receiver in a step 53, but it should be noted that any other Interference Rejection Techniques (IRC) may also apply. In one or more other examples, a beamforming stage may be used that reduces the received signal space dimensionality, followed by I+N covariance matrix estimation in this reduced space, and then by noise-whitening (shown in Eq. (2)). According to one or more examples, a non-linear detection method like sphere-decoding may be used in place of the LMMSE (Linear Minimum Mean Square Error) detection, after the noise-whitening stage.

The LMMSE-IRC weight matrix is given by:

$$W_{f,t} = [H_{f,t,eff}^H R_n^{-1} H_{f,t,eff} + I_{N_l}]^{-1} H_{f,t,eff}^H R_n^{-1} \in \mathbb{C}^{N_l \times N_r}. \tag{3}$$

Let $\Lambda_{f,t} \stackrel{\text{def}}{=} diag(W_{f,t} H_{f,t,eff})$ with its diagonal elements denoted by $\lambda_{i,f,t}$, $i=1, \ldots, N_l$. Then, Interference and Noise joint equalization is performed in a step 54 by a central processor CP of the receiver from the estimated channel matrix, the estimated overall I+N covariance matrix $R_n$ and the results of IRC detection. This step 54 of joint equalization provides the (normalized) input $\hat{x}_{f,t} \in \mathbb{C}^{N_l \times 1}$ and the associated post-equalization SINR (Signal To Noise Ratio) $\rho_{i,f,t}$ of Layer i, which are $$\hat{x}_{f,t} = \Lambda_{f,t}^{-1} W_{f,t} y_{f,t}, \tag{4}$$

$$\rho_{i,f,t} = \frac{\lambda_{i,f,t}}{1 - \lambda_{i,f,t}}, i = 1, \ldots, N_l.$$

This operation of Interference and Noise joint equalization is a functionality of a detector of the MU-MIMO receiver. These features $\hat{x}_{f,t}$ and $\rho_{i,f,t}$ output by the detector of the receiver, are then used in a step 55 to generate LLRs for each UE i at a demapper. As known in the art, the demapper has the functionality to generate the LLRs, and performs the opposite of a mapper (which maps a set of bits to a constellation point). Here, the demapper works on the equalized signals and demaps the equalized symbol to a set of LLRs (which represent the beliefs about the transmitted bits).

In practice, only estimates of channel matrix $H_{f,t,eff}$ and I+N overall covariance matric $R_n$ are available. There are thus denoted by $\hat{H}_{f,t,eff}$ and $\hat{R}_n$.

Figure 5B:
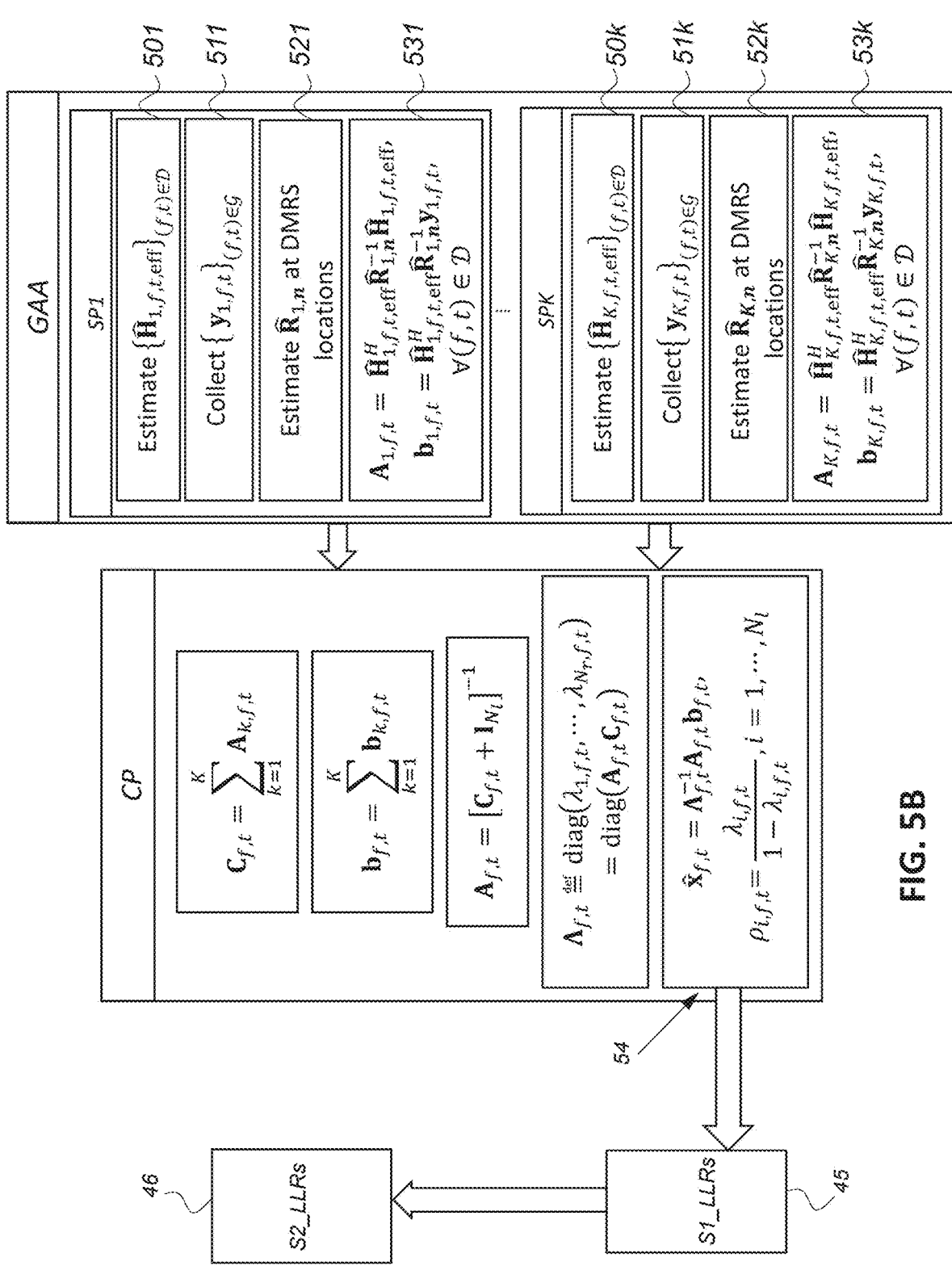

In relation with FIG. 5B, we now consider that cell A of base station BS is served by K co-located sub-panels SP1-SPK forming a global antenna array GAA with each sub-panel consisting of a subset of the total set N, of antennas or TRX and processing of data signals {DSIGk} received by each sub-panel SPk is detailed. FIG. 5B has steps in common with FIG. 4, that are referenced with the same numbers and are not further detailed hereinafter.

In the example of FIG. 5B, data signals are received at steps 511 . . . 51k . . . 51K by the K co-located sub-panels and independently processed.

Let $N_m$ be the number of TRXs in each sub-panel (so that $KN_m=N_r$). The effective channel on TRXs of sub-panel k on the RE indexed by (f, t), donated $$\hat{H}_{k,f,t,eff} \in \mathbb{C}^{\frac{N_r}{K} \times N_l},$$

is estimated in a step 51k. Then, in a step 53k, an I+N covariance matrix (in the lower dimensional sub-panel antenna space) denoted by $\hat{R}_{k,n}\in \mathbb{C}^{N_m \times N_m}$ is individually estimated at sub-panel k, and the overall effective estimated I+N covariance matrix $\hat{R}_n\in \mathbb{C}^{N_r \times N_r}$ can be approximated to have a block-diagonal structure given by $\hat{R}_{n,approx}=\text{diag}(\hat{R}_{1,n}, \hat{R}_{2,n}, \ldots, \hat{R}_{K,n})$.

The sub-panel outputs are combined as follows:

(3) can be written as $$W_{f,t}y_{f,t} \approx \left[\sum_{k=1}^{K} \hat{H}_{k,f,t,eff}^{H}\hat{R}_{k,n}^{-1}\hat{H}_{k,f,t,eff} + \right. \tag{5}$$
$$\left. I_{N_l}\right]^{-1}\sum_{k=1}^{K} \hat{H}_{k,f,t,eff}^{H}\hat{R}_{k,n}^{-1}y_{k,f,t}$$

and $$\Lambda_{f,t} = \text{diag}(W_{f,t}H_{f,t,eff}) \approx \text{diag}\left(\left[\sum_{k}^{K} \hat{H}_{k,f,t,eff}^{H}\hat{R}_{k,n}^{-1}\hat{H}_{k,f,t,eff} + \right.\right. \tag{6}$$
$$\left.\left. I_{N_l}\right]^{-1}\sum_{k=1}^{K} \hat{H}_{k,f,t,eff}^{H}\hat{R}_{k,n}^{-1}\hat{H}_{k,f,t,eff}\right),$$

where $y_{k,f,t} \in \mathbb{C}^{\frac{N_r}{K} \times 1}$ denotes the received signal on the TRXs of Sub-panel k on the RE indexed by $$(f, t), \hat{H}_{k,f,t,eff} \in \mathbb{C}^{\frac{N_r}{K} \times N_l}$$

denotes the estimated effective channel on TRXs of sub-panel k on the RE indexed by (f, t), and $$\hat{R}_{k,n} \in \mathbb{C}^{\frac{N_r}{K} \times \frac{N_r}{K}}$$

denotes the estimated I+N covariance at Sub-panel k. Then, joint equalization is performed at step 54 to obtain the equalized signal $\hat{x}_{f,t}\in \mathbb{C}^{N_l \times 1}$ and the associated post-equalization SINR $\rho_{i,f,t}$, i=1, . . . , $N_l$ from the matrices {$A_{k,f,t}$} and vectors {$b_{k,f,t}$}. These are further used to generate a first set of LLRs, S1_LLRs, for each UE i (using a demapper) at step 45. These LLRs are functions of the received signal $y_{f,t}$, the channel matrix estimate $\hat{H}_{f,t,eff}$, and the block-diagonal approximated $\hat{R}_{n,approx}=\text{diag}(\hat{R}_{1,n}, \hat{R}_{2,n}, \ldots, \hat{R}_{K,n})$.

When the I+N is significantly colored (which corresponds to a likely scenario for extreme MIMO receivers), it can be checked that Eq. 5 may be a poor approximation of Eq. 3 due to the missing non-diagonal block matrices of R. This results in inaccurate symbol equalization (Eq. 6) and hence, a loss in throughput. It is this block-diagonal approximation that leads to this loss in throughput. From a complexity and engineering perspective, it is difficult to obtain the full I+N covariance matrix $\hat{R}_n\in \mathbb{C}^{N_r \times N_r}$ (that one would obtain with a full-panel approach), and some of the loss is irrecoverable.

Figures 6A, 6B:
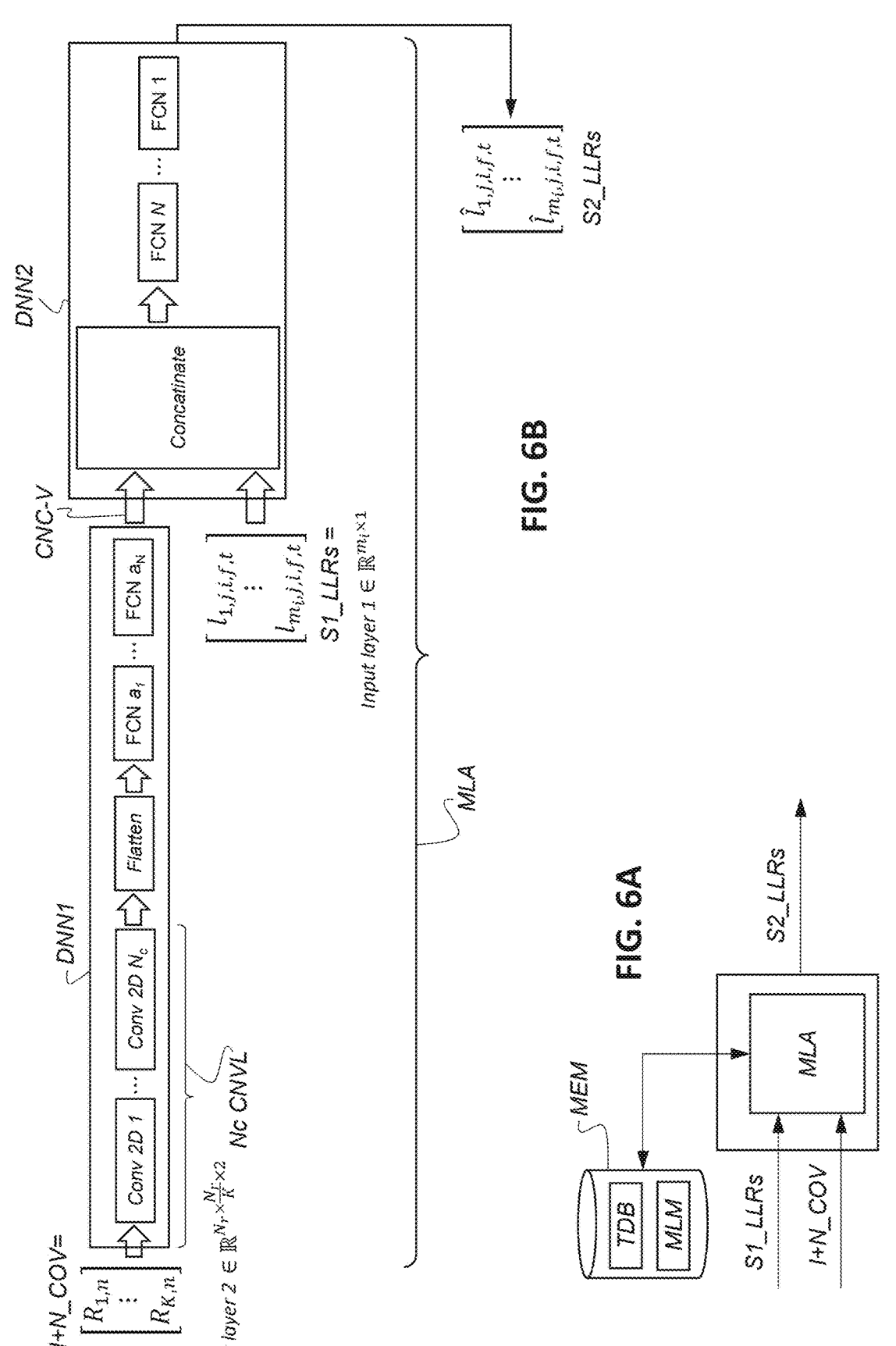
FIGS. 6A and 6B are block diagrams illustrating exemplary architectural structures of a machine learning agent trained to output a second set of corrected LLRs from an input comprising a first set of LLRs according to an example.

At step 46, the first set of LLRs is applied to a machine learning program or agent MLA, which has been trained to undo the remaining loss, and outputs a second set of corrected LLRs, S2_LLRs. As illustrated by FIG. 6A, in one or more examples, inputs of the MLA are the first set of LLRs, S1_LLRs, along with the overall effective estimated I+N covariance matrix Rn and the output of the MLA is the second set of corrected LLRs, S2_LLRs.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model from example training data in order to make data-driven predictions or decisions expressed as outputs or assessments. Although example embodiments are presented with respect to a few machine-learning tools, the principles presented herein may be applied to other machine-learning tools.

A purpose of machine-learning is here to learn to identify the right kind of LLR correction based on the value of $\hat{R}_{n,approx}$. For example, if $\hat{R}_{n,approx}$ is a diagonal matrix, this means that the I+N is not spatially coloured, and no correction is needed. If however, the individual blocks $\hat{R}_{p,n}$, p=1, . . . , K, are not well-conditioned, it means that there is a significant degree of spatial colouring and that the block-diagonal approximation is quite poor. In such a case, LLR correction is required. A well-trained machine-learning model should be able to:

Decide when to correct LLRs,

Decide the kind of correction to perform when needed.

In example embodiments, a supervised mode is used for training ML and building the ML model. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

The training dataset comprises examples of values for the input features associated with labels indicating the features to be output. The machine-learning algorithms utilize the training data to find correlations among identified features that affect the outcome. A feature is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

In one example embodiment, training data can be collected as follows: Multiple test UEs ($N_u$) are configured to transmit known data to a base station BS equipped with multiple sub-panels. The transmitted bits by each UE are stored in a database TDB of a memory MEM (as an example, the UEs could be configured to transmit a known source file, for example a known text or video sequence). At the base station or gNB, the received signals from all the sub-panels are used to compute a first set of LLRs for the transmitted bits by each UE as previously described. These computed LLRs are stored in the database TDB. The estimated I+N covariance matrices of each sub-panel are also stored. The position of the UEs is then varied in order to ensure that the channels seen by each gNB and the I+N matrices estimated by the sub-panels have sufficient variety. For each UE position, the set of transmitted data bits (which form the labels), the first sets of computed LLRs and the set of I+N covariances matrices of each sub-panel (which for the input features) are stored in the database TDB. This database is then used to train the ML model MLM using the BCE loss function. The training is performed until a stopping criterion is reached. An example stopping criterion is the training loss being below a certain threshold. Another example is the norm of the gradients of the loss with respect to the trainable parameters being below a certain threshold.

Once training phase is over, the model MLM is then charged into the ML agent which can then be used in an operation phase. The model MLM can be retrained from time to time if necessary in order to improve performance.

FIG. 6B describes an exemplary architecture of a machine learning agent MLA that may be used to correct the first set of LLRs, S1_LLRs in one or more examples.

FCN denotes "fully-connected network", and Conv2D denotes a 2-D convolutional layer. In this example, the MLA comprises a first deep neural network (DNN) DNN1 and a second deep neural network DNN2. DNN1 is used with Nc, Nc being an integer greater than 2, convolutional layers to reduce the number of trainable parameters from the input overall effective estimated I+N covariance matrix $$\hat{R}_{n,approx} = \left[\hat{R}_{1,n}, \hat{R}_{2,n}, \ldots, \hat{R}_{K,n}\right]^T \in \mathbb{R}^{N_r \times \frac{N_r}{K} \times 2}.$$

Here the third dimension is because real and imaginary parts of $\hat{R}_{n,approx}$ are input along separate dimensions. Nc is usually chosen heuristically. For example, Nc may be equal to 4.

Indeed, since the estimated covariance matrices of all the K sub-panels $$\hat{R}_{p,n} \in \mathbb{C}^{\frac{N_r}{K} \times \frac{N_r}{K}}, p = 1, \ldots, K,$$

need to be input to the MLA, for example as an overall I+N covariance matrix, the feature space becomes quite large.

This first deep neural network DNN1 is configured and trained to output a vector of features having a reduced size with respect to the input I+N covariance matrices. The input is of dimension Nr by Nr/K which can be large. For example, with Nr=256 and K=4, it may comprise 256*64 elements. A goal is to find the lower-dimensional salient features of the large-dimensional input I+N covariance matrix, while preserving the essential relationship between its elements.

The first neural network DNN1 is trained towards the goal of bringing this down to a lower-dimensional space, namely a vector of 16 or 32 or 64 elements, for example. This reduction of size also contributes to ease the learning phase of the whole MLA by reducing time and also memory.

This further allows to use a smaller sized neural network DNN2. In theory, it can be arbitrarily large but that would increase the size of the DNN2. The features of this vector are all real-valued.

Let $l_{k,j,i,f,t}$, k=1, . . . , mi, denote the LLR for bit $b_{k,j,i,f,t}$ (the $k^{th}$ bit on stream j for UE i on RE (f, t)) generated by the receiver (comprising a detector followed by a demapper) at the base station (as UE i uses a constellation of size $2^{m_i}$). Then, the MLA comprises a second deep neural network DNN2, whose inputs are the vector of features output by the first deep neural network DNN1 and the first set of LLRs:

$$\left[l_{1,j,i,f,t}, \ldots, l_{m_i,j,i,f,t}\right]^T \in \mathbb{R}^{m_i \times 1}$$

The output of the MLA (e.g. DNN2) is $[\hat{l}_{1,j,i,f,t}, \ldots, \hat{l}_{m_i,j,i,f,t}]^T \in \mathbb{R}^{m_i}$ which represents the corrected LLRs. The DNN is trained using the binary cross-entropy (BCE) loss function on each training sample which is given as:

$$\mathcal{L}(\hat{l}, b) \overset{def}{=} -\frac{1}{m_i}\sum_{k=1}^{m_i} b_{k,i,j,f,t}\log\left(\frac{1}{1 + e^{-\hat{l}_{k,j,i,f,t}}}\right) + \tag{7}$$

$$(1 - b_{k,i,j,f,t})\log\left(\frac{e^{-\hat{l}_{k,j,i,f,t}}}{1 + e^{-\hat{l}_{k,j,i,f,t}}}\right)$$

where $b_{k,i,j,f,t}$, k=1, . . . , $m_i$, are the transmitted bits for UE i corresponding to the LLRs $l_{k,j,i,f,t}$, k=1, . . . , $m_i$.

Figure 7:
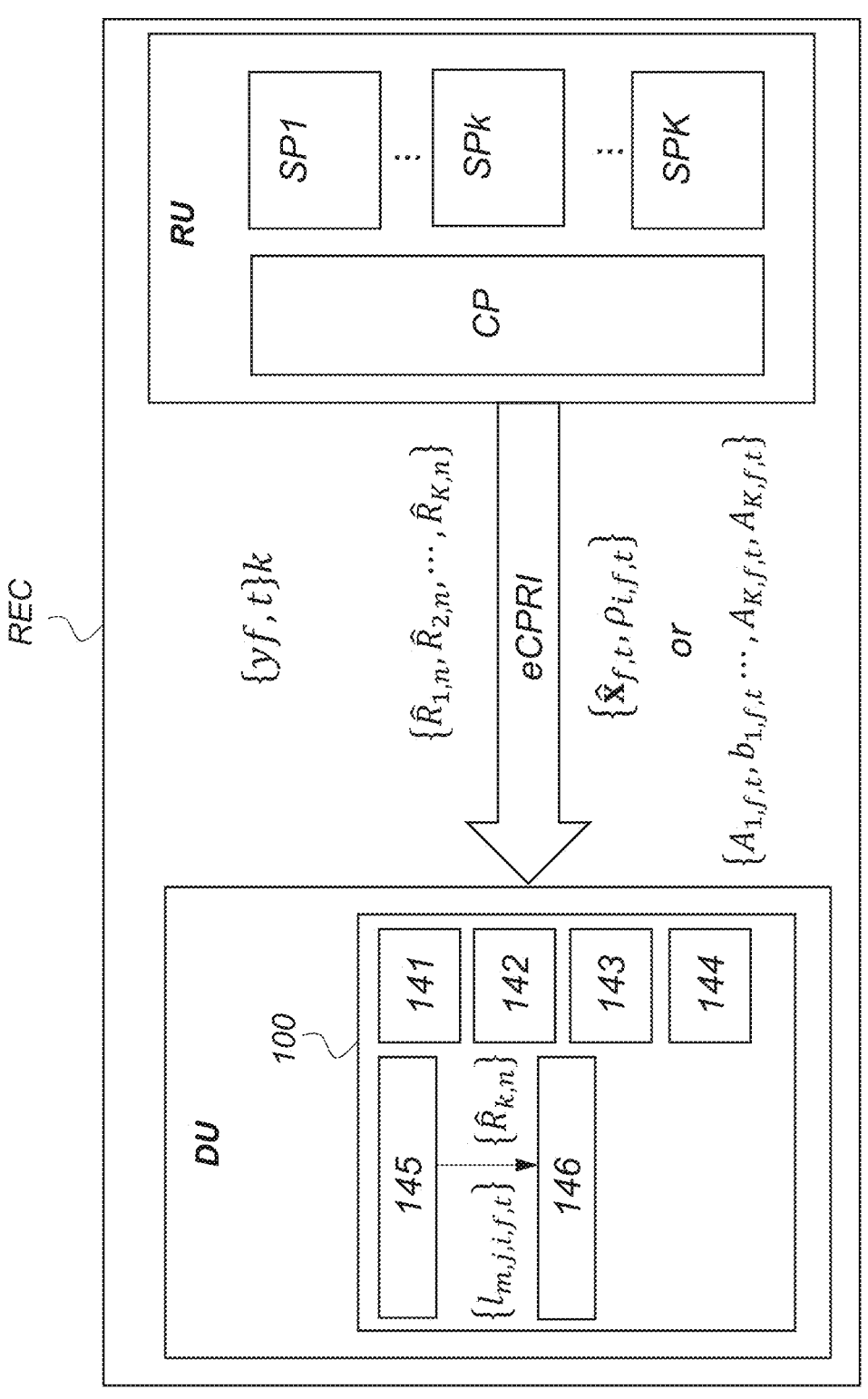
FIG. 7 is a block diagram illustrating an exemplary functional structure of a receiver configured to implement the method according to another example.

In one or more examples, the implemented method may be implemented by an apparatus 100. As illustrated by FIG. 7, the apparatus 100 may be integrated a MU-MIMO sub-panel-based receiver REC of a base station, for instance the base station BS of FIG. 1. As depicted by FIG. 7, the sub-panel-based receiver REC comprises several blocks that may be situated in different ORAN ("Open RAN") units among which RU, DU and CU (not represented) units. The K sub-panels SP1-SPK are in the radio unit (RU).

In one or more examples, the apparatus 100 is integrated into the DU and comprises means 141 for obtaining the data signals {DSIGk} representative of one or more bits of information transmitted by one or more user equipment UEi and received by the K sub-panels, means 142 for obtaining interference and noise, I+N, covariance matrices {I+N-COVK} individually estimated the sub-panels for said received data signals, means 145 for obtaining a first set of Log Likelihood Ratios, S1_LLRs, generated for at least one bit of said information transmitted by the UEi, at least from said received data signals and said I+N covariance matrices, and means 146 for obtaining a second set of applying the LLRs and the I+N covariance matrices as inputs to a neural network, said neural network having been trained to output corrected LLRs.

In one or more examples, the RU further comprises a central processing module CP configured to combine the outputs of the K sub-panels and to output a single LLR for each bit transmitted by a UE UEi. One of the functionalities of CP is to perform joint channel and noise equalization of the received data signals (step 44 of FIG. 4, step 54 of FIGS. 5A and 5B), the outputs of the joint equalization being the inputs of the mapper that generates the LLRs. In other examples (not represented) the central processing module CP may either be implemented in in the DU. If it is in the RU, the outputs of the joint channel and noise equalization module, which are the equalized symbols $\{\hat{x}_{f,t}\}$ and the post-equalization SINR $\{\rho_{i,f,t}\}$ are transmitted to the DU via the eCPRI link. Otherwise, if the central processing module CP is in the DU, the outputs of each sub-panel SPk (see FIG. 5) needed for performing this joint equalization, which are the matrices $\{A_{k,f,t}\}$ and vectors $\{b_{k,f,t}\}$, are transmitted to the DU via the eCPRI link, as shown in FIG. 7.

Generation 145 of the first set of LLRs usually happens in the DU. In some exceptional implementations, this might happen in the RU itself. In the latter case, only the first set of LLRs is transmitted to the DU via the eCPRI link (not shown in FIG. 7).

Unlike in conventional receivers, sub-panel I+N covariance matrices $\hat{R}_{1,n}, \hat{R}_{2,n}, \ldots, \hat{R}_{K,n}$ are used by apparatus 100 to compute a second set of corrected LLRs, S2_LLRs.

Therefore, these are additionally transmitted from the RU to the DU via the eCPRI link as shown in FIG. 7. It should be noted that these are $$\frac{N_r}{K} \times \frac{N_r}{K}$$

sized matrices (one per sub-panel and one for every few PRBs). In this regard, a PRB is a set of 12 consecutive subcarriers. Since a PRB in an OFDM grid has 12 subcarriers and around 10 OFDM symbols for data, it is around 120 resource elements (REs). For each RE, the LLRs or the equalized symbols need to be transmitted. However, for a group of PRBs, only K matrices of size (Nr/K, Nr/K) are transmitted, which is thus a negligible overall additional overhead compared to the other data conventionally transmitted across the eCPRI link.

Figure 8A:
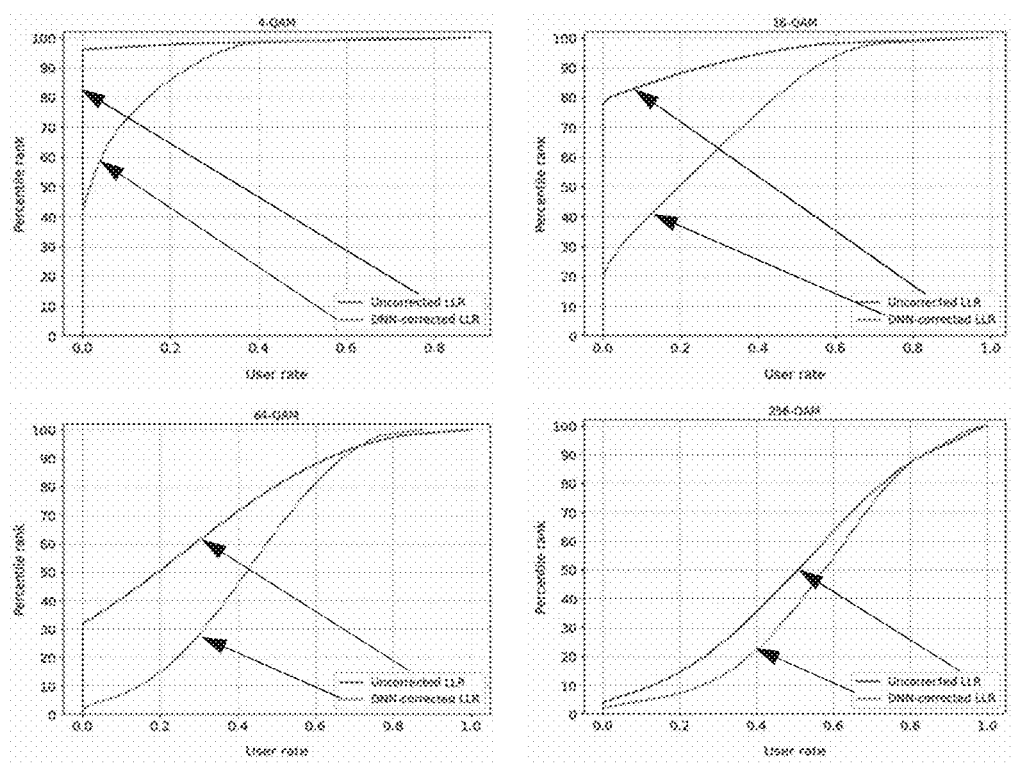
FIGS. 8A and 8B present simulation results comparing user rates obtained with and without the method.
Figure 8B:
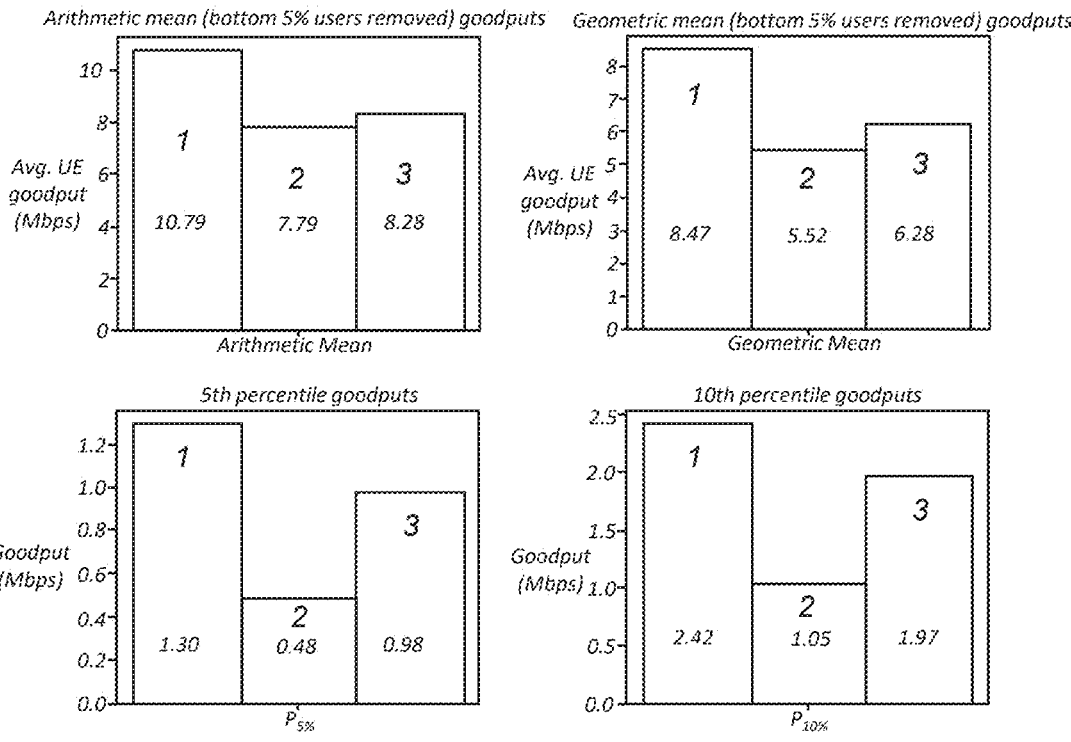

In relation with FIGS. 8A and 8B, simulation results are now presented.

A multi-cell, multi-link-level simulation (MCMLLS) was performed. The simulation code was written in Python and TensorFlow, and we consider a 21-cell, 210-UE setting with the parameters presented in Tables 1 and 2:

TABLE 1

| Site Parameters | |
| --- | --- |
| # sites | 7 |
| # cells/site | 3 |
| ISD | 200 m |
| # users | 210 |

TABLE 2

| Channel Parameters | | |
| --- | --- | --- |
| Channel Model | 38.901 | Urban Micro |
| $f_c$ | 7 | GHz |
| Subcarrier-spacing | 30 | kHz |
| # PRBs | | 24 |
| Channel BW | 8.64 | MHz |

TABLE 3

| Other Parameters | |
| --- | --- |
| Target received power $P_0$ | −100 dBm |
| Open loop power control fractional path-loss compensation factor $\alpha$ | 0.85 |
| Maximum total output power per UE | 23 dBm |
| Noise figure at cell | 5 dB |
| Number of independent user drops | 5 |
| Number of slots per drop | 100 |
| BW allocation to UE | Variable according to Tx power limit |
| HARQ max number of retransmissions | 4 |
| Slot duration | 0.5 ms |
| Channel estimation | Joint LMMSE across antennas |
| DMRS | 5G Type 1 double-symbol DMRS |
| Interference + noise covariance estimation | Practical estimation at DMRS locations |
| LDPC codes | 5G |

TABLE 4

| Antenna parameters | |
| --- | --- |
| Cell antenna array | 128-TRX (4 × 16 × 2) |
| Number of sub-panels | 8 |
| # Antenna elements | 384 (3 × 1 subarray) |
| UE antenna array | 4-TRX (1 × 2 × 2) |

TABLE 5

| Site antenna configuration | |
| --- | --- |
| Mechanical bearing | [0°, 120°, −120°] |
| Mechanical down tilt | 0° |
| Slant angle | 0° |
| Electrical panning | 0° |
| Electrical uptilt | −7.5° |
| HPBW in the azimuth | 95° |
| HPBW in the elevation | 95° |

TABLE 5-continued

| Site antenna configuration | |
|---|---|
| Subarray size | 3 × 1 (row × col) |
| AE row spacing | 0.65λ |
| AE column spacing | 0.5λ |
| Maximum sub-array gain | 9.5 dBi |
| Slant angles (degrees) in the panel in the local coordinate system | [45°, −45°] |

A training dataset was also obtained using this setup, wherein the labels correspond to the actual bits transmitted by each UE, and the input features were the generates LLRs (S1-LLRs) and the individual I+N covariance matrices of the 8 sub-panels. A separate machine learning agent MLA was trained for each QAM constellation (4-/16-/64-/256-QAM were used). The DNNs (DNN1 and DNN2) used for 4-QAM were chosen to have the structure shown in table 5 below. It should be noted that a similar structure may be used for other constellations except shapes of the input and the output layers which are specific to each constellation.

TABLE 6

| Layer | Output Shape | Param # | Connected to | Activation |
|---|---|---|---|---|
| Input_2 (InputLayer) | (B, 128, 16, 2) | 0 | | None |
| Conv2D_1 (Conv2D) | (B, 64, 8, 128) | 1152 | 'Input_2' | ReLU |
| Conv2D_2 (Conv2D) | (B, 32, 4, 64) | 32832 | 'Conv2D_1' | ReLU |
| Conv2D_3 (Conv2D) | (B, 16, 2, 16) | 4112 | 'Conv2D_2' | ReLU |
| Conv2D_4 (Conv2D) | (B, 8, 1, 4) | 260 | 'Conv2D_3' | ReLU |
| Input_1 (InputLayer) | (B, 2) | 0 | | None |
| Flatten (Flatten) | (B, 32) | 0 | 'Conv2D_4' | None |
| Concat (Concatenate) | (B, 34) | 0 | 'Input_1 & 'Flatten' | None |
| Dense_1 (Dense) | (B, 128) | 4480 | 'Concat' | ReLU |
| Dense_2 (Dense) | (B, 128) | 16512 | 'Dense_1' | ReLU |
| Dense_3 (Dense) | (B, 128) | 16512 | 'Dense_2' | ReLU |
| output (Dense) | (B, 2) | 258 | 'Dense_3' | Linear |

FIG. 8A shows the empirical results on the test data. These are the percentile ranks of the empirical UE rates calculated as max $\{0, 1-BCE (Tx\ bits, DNN\ output)\}$, where BCE (Tx bits, DNN output) is the average BCE between the transmitted bits of the user and the effective output LLRs of the DNN (for the constellation in context). It can be seen that a significant improvement occurs with DNN-assisted LLR correction for low channel coding rates, suggesting that the low rate UEs can expect a significant improvement in performance, while the high rate UEs will not see similar gains.

Next, we used the trained MLA comprising DNN1 and DNN2 in the MCMLLS (with different UE drops than the ones used for training). FIG. 8B shows plots of the Arithmetic Mean (AM), the Geometric Mean (GM) of the UE goodput (over 5 independent drops) with the bottom 5% of the UEs removed, and also the 5th and the 10th percentile UE goodputs. The plots are for:

1. Full-panel processing (i.e., without the sub-panel-based processing).
2. Sub-panel-based processing without LLR correction.
3. Sub-panel-based processing with DNN-assisted LLR correction.

The key observation is that without LLR correction, there is a significant degradation in performance (around 28% for the AM, around 34% for the GM, and more for the 5th and 10th percentile UE rates). With DNN-assisted LLR correction performed by the method described herein, the overall AM improves by 6% (since the AM is dominated by high-rate UE goodput which we know will not be improved significantly) relative to the case without LLR correction, but the 5th and the 10th percentile UE rates nearly double. The GM, in accordance, improves by around 14%.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host device or host system. The instructions may be transmitted over the computer-readable medium and be loaded onto the host device or host system. The instructions are configured to cause the host device or host system to perform one or more functions disclosed herein. For example, as mentioned above, according to one or more examples, at least one memory may include or store instructions, the at least one memory and the instructions may be configured to, with at least one processor, cause the host device or host system to perform the one or more functions. Additionally, the processor, memory and instructions, serve as means for providing or causing performance by the host device or host system of one or more functions disclosed herein.

Figure 9:
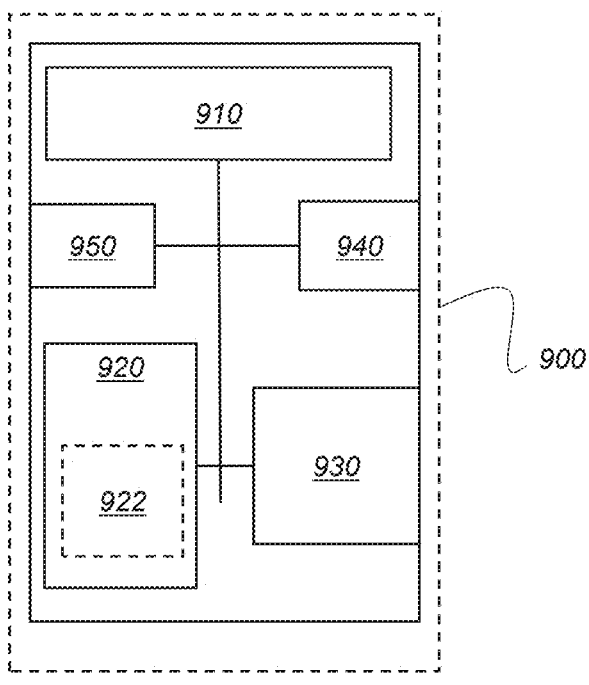
FIG. 9 is a block diagram illustrating an exemplary hardware structure of an apparatus implementing the method according to another example.

The apparatus 900 of FIG. 9 illustrates an exemplary embodiment of an apparatus such as, or comprised in, a host device such as a receiver comprised in a base station. The receiver is equipped with a plurality of co-located sub-panels comprising each an antenna array comprising a plurality of transceivers TRX. The apparatus may comprise, for example, a circuitry or a chipset applicable to a base station to realize some of the described exemplary embodiments. The apparatus 900 may be an electronic device comprising one or more electronic circuitries. The apparatus 900 may comprise a communication control circuitry 910 such as at least one processor, and at least one memory 920 including a computer program code (software) 922 wherein the at least one memory and the computer program code (software) 922 are configured, with the at least one processor, to cause the apparatus 900 to carry out some of the exemplary embodiments described above.

The memory 920 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store a current neighbour cell list, and, in some exemplary embodiments, structures of the frames used in the detected neighbour cells.

The apparatus 900 may further comprise a communication interface 930 comprising hardware and/or software for realizing communication connectivity according to one or more communication protocols. The communication interface 930 may provide the apparatus with radio communication capabilities to communicate in the cellular communication system. The communication interface may, for example, provide a radio interface to terminal devices. The apparatus 900 may further comprise another interface towards a core network such as the network coordinator apparatus and/or to the access nodes of the cellular communication system. The apparatus 900 may further comprise a scheduler 940 that is configured to allocate resources.

As used in this application, the term "circuitry" may refer to one or more or all of the following:

hardware-only circuit implementations (such as implementations in only analog and/or digital circuitry) and i. a combination of analog and/or digital hardware circuit(s) with software/firmware and ii. any portions of hardware processor(s) with software (including digital signal processor(s)), software, and memory(ies) that work together to cause an apparatus, such as a mobile phone, to perform various functions) and b. combinations of hardware circuits and software, such as (as applicable):

i. a combination of analog and/or digital hardware circuit(s) with software/firmware and ii. ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this patent application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

LIST OF MAIN ABBREVIATIONS

AE Antenna Element
AM Arithmetic Mean
BS Base Station
CU Centralized Unit
DU Distributed Unit
CNN Convolutional Neural Network
DNN Deep Neural Network
DU Distributed Unit
eCPRI Evolved Common Public Radio Interface
FCN Fully-Connected Network
GM Geometric Mean
gNB next generation NodeB
HPBW Half Power Bandwidth
I+N Interference-plus-Noise
IRC Interference Rejection Combining
LLR Log-Likelihood Ratio
LMMSE Linear Minimum Mean Square Error
MCMLLS Multi-Cell, Multi-Link-Level simulation
MU Multi-User Multiple-Input Multiple-Output MIMO
ORAN Open RAN
PoC Proof-of-Concept
PRB Physical Resource Block
RAN Radio Access Network
RE Resource Element
RF Radio Frequency
SINR Signal-to-Interference Noise Ratio
UE User Equipment

The invention claimed is:

1. A method comprising:

Obtaining received data signals representative of one or more bits of information transmitted by at least one user equipment to a receiver of a radio cellular network, said receiver comprising two or more sub-panels of antennas, obtaining interference and noise, I+N, covariance matrices individually estimated at at least two of said sub-panels for said received data signals, obtaining equalized signals by performing joint channel and noise equalization of said received data signals at least from said estimated I+N covariance matrices, for at least one bit of said information transmitted by one of said users, obtaining a first set of Log Likelihood Ratios, LLRs, generated at least from said received data signals and said equalized signals, obtaining a second set by applying the first set of LLRs and the I+N covariance matrices as inputs to a neural network, said neural network having been trained to output corrected LLRs.

2. The method of claim 1, wherein the method further comprises combining said individually estimated I+N covariance matrices into an overall block-diagonal I+N covariance matrix, said overall I+N covariance matrix being used for obtaining the first set of LLRs.

3. The method of claim 2, wherein, said neural network comprising a first and a second neural networks, the overall I+N covariance matrix is input to one or more convolutional layers of said first neural network, said first neural network being trained to output a vector of covariance elements, said method further comprises concatenating said vector of covariance elements with a vector comprising said first set of LLRs, a concatenated vector being obtained, and applying said concatenated vector as an input to the second neural network, said corrected LLRs being output by said second neural network.

4. The method according to claim 3, wherein the first and second neural networks are trained using a binary cross-entropy loss function.

5. A non-transitory computer-readable medium comprising program instructions which when executed by a receiver cause the receiver to perform a method comprising:

obtaining received data signals representative of one or more bits of information transmitted by a user equipment to a receiver of a radio cellular network, said receiver comprising two or more sub-panels of antennas, obtaining interference and noise, I+N, covariance matrices individually estimated at each of said sub-panels for said received data signals, obtaining equalized signals by performing joint channel and noise equalization of said received data signals at least from said estimated I+N covariance matrices, for at least one bit of said information transmitted by one of said users, obtaining Log Likelihood Ratios, LLRs, generated for each of two or more sub-panels of said receiver, at least from said received data signals and said equalized signals, applying the LLRs and the I+N covariance matrices as inputs to a neural network, said neural network having been trained to output corrected LLRs, and obtaining the output corrected LLRs.

6. An apparatus comprising:

at least one processor and at least one memory storing instructions that, when executed by the at least one processor, cause the apparatus at least to:

obtain received data signals representative of one or more bits of information transmitted by at least one user equipment to a receiver of a radio cellular network, said receiver comprising two or more sub-panels of antennas, obtain interference and noise, I+N, covariance matrices individually estimated at at least two of said sub-panels for said received data signals, obtain equalized signals by performing joint channel and noise equalization of said received data signals at least from said estimated I+N covariance matrices, for at least one bit of said information transmitted by one of said users, obtain a first set of Log Likelihood Ratios, LLRs, generated at least from said received data signals and said equalized signals, obtain a second set by applying the first set of LLRs and the I+N covariance matrices as inputs to a neural network, said neural network having been trained to output corrected LLRs.

7. The apparatus of claim 6, wherein the instructions, when executed by the at least one processor, cause the apparatus to: combine said individually estimated I+N covariance matrices into an overall block-diagonal I+N covariance matrix, said overall I+N covariance matrix being used for obtaining the first set of LLRs.

8. The apparatus of claim 7, wherein said neural network comprising a first and a second neural networks, the overall I+N covariance matrix is input to one or more convolutional layers of said first neural network, said first neural network being trained to output a vector of covariance elements, and wherein the instructions, when executed by the at least one processor, cause the apparatus to:

concatenate said vector of covariance elements with a vector comprising said first set of LLRs, a concatenated vector being obtained, and apply said concatenated vector as an input to the second neural network, said corrected LLRs being output by said second neural network.

9. The apparatus of claim 8, wherein the first and second neural networks are trained using a binary cross-entropy loss function.

10. The apparatus of claim 6, wherein the apparatus is incorporated within the receiver, and wherein the receiver further comprises two or more sub-panels of antennas.

* * * * *